J. P. JEFFRIES.
Composition-Tile for Roofing and Paving.
No. 159,329. Patented Feb. 2, 1875.
A
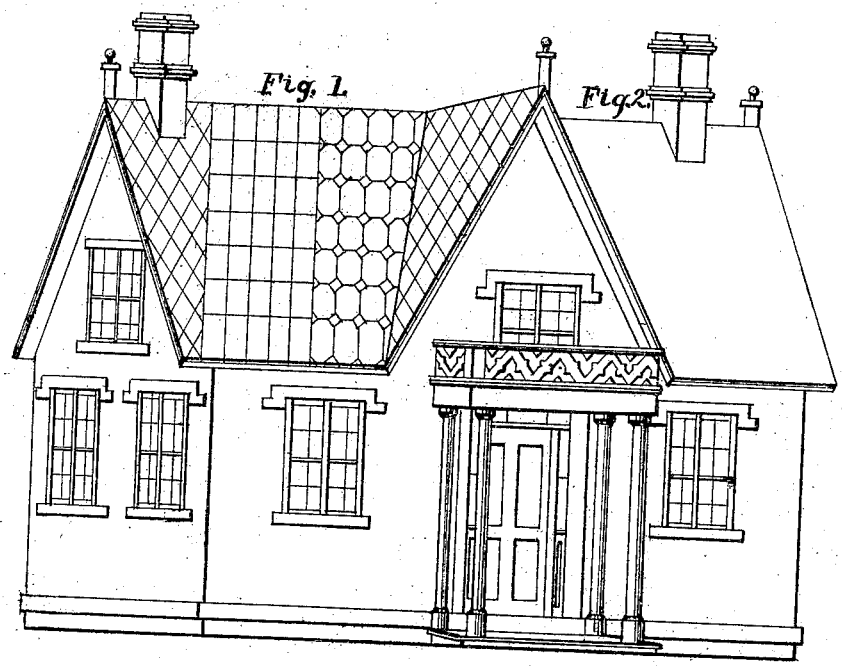
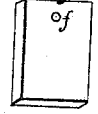 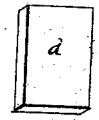 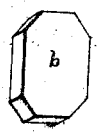 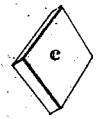 
WITNESSES:
J W Baughman
Jesse Faste
INVENTOR:
John P. Jeffries

UNITED STATES PATENT OFFICE.

JOHN P. JEFFRIES, OF WOOSTER, OHIO.

IMPROVEMENT IN COMPOSITION TILES FOR ROOFING AND PAVING.

Specification forming part of Letters Patent No. 159,329, dated February 2, 1875; application filed November 27, 1874.

*To all whom it may concern:*

Be it known that I, JOHN P. JEFFRIES, of the city of Wooster, in the county of Wayne and State of Ohio, have invented certain Improvements in Fire and Water Proof Cement, of which the following is a specification:

The first part of my invention relates to the combination of mineral substances and acids, such as silica, sulphate of lime, hydraulic lime, oxide of magnesia, sulphate of potassa, alum, borax, sulphuric acid, and carbonic acid, or carbonic anhydride, so that all, without the aid of external heat, will (except the acids) form a solid hard substance capable of, to a very great extent, resisting fire, and of resisting the influence of water.

The second part of my invention relates to the manner of combining the above-described materials in their proper proportions, so as to form the above-described substance so that the same can be applied in roofing buildings, paving floors and walks, and other purposes, showing the per cent. of the ingredients to be used in the composition, with the manner of making and applying the same to the uses and purposes designed.

The proportions of the ingredients composing the cement material in every one hundred pounds of the first-mentioned minerals are as follows, to wit: Forty pounds of fine silica; forty pounds of hydraulic lime; twenty pounds of sulphate of lime. These three minerals must be well mixed together while in their dry condition.

Of the others there must be reduced to solution in boiling water, as follows: Five pounds of alum; four pounds of borax; four pounds of sulphate of potassa, and four pounds of oxide of magnesia must be reduced to a thin paste by sulphuric acid and water, and then mixed with the above solution. To the solution must then be added sufficient water to saturate the said silica, hydraulic lime, and sulphate of lime, so as to make the same of the consistency of mortar, capable of being molded into roofing-tiles or paving material, and of being spread with a trowel over roof-sheeting or other surface while in its plastic condition.

While in this condition it can readily be molded into roofing-tiles or paving material of any size, thickness, or shape desired. For roofing purposes the tile need not be over three-fourths of an inch thick, and for all ordinary roofing five-eighths of an inch in thickness will be sufficient for all purposes. The edges of the tile must be beveled one-eighth of an inch, and the beveled side must be laid upward, so that when the lower edges are in contact an opening or space will be left at the top one-fourth inch wide all around the tile, in which sufficient of the cement material must be placed to make the same water-tight. The tiles thus made can be used for roofing purposes, as represented by the drawing A hereto annexed. They may be molded and laid the same day, but better to allow them to become dry before laying them. They will soon become hard, and, if their surface be flowed with carbonic acid or carbonic anhydride, will eventually become as hard as marble. The surface of the tile should be flowed with the above acid when the same has become dry before any paint is applied, as such flowage aids much in the hardening of the material. The tile must be laid so as to rest firmly upon the paper board hereinafter mentioned, resting upon the roof-sheeting or other substance, and, if laid upon steep places, must rest upon a nail driven in the sheeting or other material upon which they rest. For this purpose a hole is made in the under side of the tile, as shown at $f$, Fig. 3. As the joints of the tile are being filled by the cement their size and shape can be preserved by a pointing-trowel.

A good fire and water proof roof can be made of said cement material by spreading the same, while in its plastic condition in mass, over the roof of sheeting upon the paper board or its equivalent the thickness of five-eighths of an inch. The surface should be made smooth and also flowed with the acid the same as the tile roof.

It will add to the durability of the material to paint the surface, after it has become dry, with a coat of flax-seed oil and white lead, and if this be done the acid flowing may be omitted. The paint should not be applied until complete evaporation has taken place.

During the process of drying a white powder will collect upon the surface of the tile and cement, mostly the refuse or remains of the reduced oxide of magnesia, which will aid much in closing the pores of the tile and cement when coming in contact with the oil and paint.

Figure 1 shows a roof where a portion is tiled with four orders of tile, represented by letters a b c d. Fig. 2 shows a portion of the roof cemented in mass. Fig. 3 presents the under side of the tile, in which the nail-hole is shown at f. Fig. 4 represents the upper surface of the tile a b c d as they will appear in their places in the roof.

What I claim as my invention, and for which I desire to secure Letters Patent, is—

The combination of the silica, sulphate of lime, hydraulic lime, oxide of magnesia, sulphate of potassa, alum, borax, sulphuric acid, and carbonic acid or carbonic anhydride, in the proportions and for the purpose in the foregoing specification set forth.

JOHN P. JEFFRIES.

Witnesses:
J. W. BAUGHMAN.
JESSE FASK.